3,012,068
SCHIFF BASE CARBAMATES
Alexander T. Shulgin, Berkeley, Calif., assignor to The Dow Chemical Company, Midland, Mich., a corporation of Delaware
No Drawing. Filed Apr. 11, 1960, Ser. No. 21,080
7 Claims. (Cl. 260—482)

This invention is concerned with Schiff base carbamate ester having the formula

Ar—N=CH—Ar' wherein Ar and Ar' represent substituted phenyl radicals and wherein one of Ar and Ar' is substituted with a methylcarbamoyloxy radical, —OCONHCH₃, and each of Ar and Ar' may be substituted with a radical selected from the group consisting of chloro, bromo, fluoro, nitro, lower alkyl, lower alkoxy and di(low-alkyl)amino. By the expression "lower" in "lower alkyl" and "lower alkoxy" is meant groups containing from 1 to 4 carbon atoms, inclusive.

The compounds of the present invention are crystalline solids, glasses, or oily liquids soluble in many organic solvents such as benzene, toluene, xylene, methanol, ethanol, isopropyl alcohol, methylene chloride and carbon tetrachloride and substantially insoluble in water.

The products of the present invention are useful in many agricultural applications. They are useful as toxic constituents of parasiticide compositions and are adapted to be employed for the control of insects, fungi, helminths, mites, bacteria, aphids and nematodes. They are also useful for the control of aquatic pests such as snails and trash fish. Certain of the compounds are useful in agronomical practice for the control of weeds and for inhibition of nitrification.

The compounds of particular interest are those having the formula

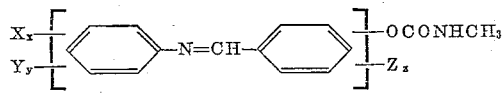

In this and succeeding formulas, X represents a radical on the phenyl ring holding the methylcarbaxoyloxy radical, OCONHCH₃, Y and Z represent radicals on the other phenyl ring; wherein each X and each Y are selected from the group consisting of lower alkyl, lower alkoxy, bromo, chloro, fluoro and nitro; Z is a di(loweralkyl)amino radical; x and y are from 0 to 3, inclusive; z is from 0 to 1 and wherein each ring contains no more than three substituents selected from —OCONHCH₃, X, Y and Z.

The Schiff base carbamate esters of the present invention may be prepared by (1) the reaction of an appropriate aldehyde compound with an appropriate amine compound, i.e., (a) a benzaldehyde compound with an aminophenol compound, or (b) a hydroxybenzaldehyde compound with an aniline compound to produce an intermediate Schiff base phenol and water of reaction followed by (2) the reaction of the intermediate Schiff base phenol with methyl isocyanate, CH₃NCO, usually in the presence of a basic catalyst. The selection of the aldehyde compound and the amine compound in step (1) of the reaction above depends on the particular benzene ring in which it is desired to have the methylcarbamoyloxy radical. Thus, (a) under (1) above is followed if the ultimate product is to have the methylcarbamoyloxy radical on the benzene ring holding the nitrogen of the Schiff base linkage, —N=CH—; however, if the ultimate product is to have the methylcarbamoyloxy radical on the ring holding the carbon of the Schiff base linkage, (b) under (1) above is to be followed. The amine compound above, i.e., the aminophenol compound or the aniline compound, may be employed as its hydrohalide salt. By "hydrohalide" is meant hydrochloride or hydrobromide.

By the expression "benzaldehyde compound" as herein employed is meant an appropriate substituted aromatic aldehyde of the benzene series, said aldehyde containing no hydroxy substituents. Representative benzaldehyde compounds include benzaldehyde anisaldehyde, o-nitrobenzaldehyde, o-bromobenzaldehyde, p-bromobenzaldehyde, m-bromobenzaldehyde, 2,6-dichlorobenzaldehyde, 2,3 - dichlorobenzaldehyde, 3,4 - diethoxybenzaldehyde, m - diethylaminobenzaldehyde, p-diethylaminobenzaldehyde, 2,3-dimethoxybenzaldehyde, 2,4-dimethoxybenzaldehyde, 2,4-dimethylbenzaldehyde, 2,5-dimethylbenzaldehyde, 2,6-dimethylbenzaldehyde, 3,4-dimethylbenzaldehyde, 3,5-dimethylbenzaldehyde, 3,4-dinitrobenzaldehyde, m - dipropylaminobenzaldehyde, p-ethoxybenzaldehyde, 3 - ethoxy-2-methoxybenzaldehyde, 3-ethoxy-4-methoxybenzaldehyde, 4-ethoxy - 3 - methoxybenzaldehyde, p-isopropoxybenzaldehyde, 4-isopropylbenzaldehyde, 3-methoxy-2-nitrobenzaldehyde, 4-methoxy - 2 - nitrobenzaldehyde, 4-bromo-2-nitrobenzaldehyde, 4-butoxy-3-ethoxybenzaldehyde, 4 - tertiary - butylbenzaldehyde, 4-(butylisobutylamino) - benzaldehyde, 5-chloro-2-methoxybenzaldehyde, 2-chloro-4-nitrobenzaldehyde, 2-chloro-5-nitrobenzaldehyde, 4-dimethylamino - 3 - nitrobenzaldehyde, 4 - nitro-2-propoxybenzaldehyde, 2-chloro-6-fluorobenzaldehyde, 2,6-difluorobenzaldehyde, 2,4,6-triisopropylbenzaldehyde, 2,3,4-trimethoxybenzaldehyde, 2,3,4-trimethylbenzaldehyde, 2,4,6-trinitrobenzaldehyde, 2,6-dimethyl-4 - methoxybenzaldehyde, 4,5-dimethoxy-2-nitrobenzaldehyde, 2,4,5-trichlorobenzaldehyde and 2,3,6-trichlorobenzaldehyde.

By the expression "aminophenol compound" as herein employed is meant an appropriate aromatic aminophenol of the benzene series. Representative aminophenol compounds include 2 - aminophenol, 3 - aminophenol, 4-aminophenol, 2-amino-4-bromophenol, 2-amino-4-tertiary-butylphenol, 5-amino-2-normal-butylphenol, 2-amino-4-chlorophenol, 2-amino-5-chlorophenol, 2-amino-6-chlorophenol, 2-amino-6-chloro-4-nitrophenol, 2-amino-4,6-dibromophenol, 4-amino-3,5-dichlorophenol, 2-amino-5-chloro-4-methoxyphenol, 4-amino-3,5-diethylphenol, 2-amino-4,6-dinitrophenol, 3-amino - 2,4 - dinitrophenol, 2-amino-4-ethylphenol, 4-amino-3-fluorophenol, 2-amino-4-isobutylphenol, 2-amino-4-isopropylphenol, 2-amino-4-methoxyphenol, 2-amino-4-nitrophenol, 3-amino-4-propylphenol, 4-amino-3,5-xylenol, 2-amino - 3,5 - xylenol, 2-amino-4-chloro-5-nitrophenol, 6-amino-2,4-xylenol and 4-amino-5-ethyl-m-cresol.

By the expression "hydroxybenzaldehyde compound" as herein employed is meant an appropriate aromatic aldehyde of the benzene series having a hydroxy substituent and which may contain other substituents. Representative hydroxybenzaldehyde compounds include 3-ethoxy-4-hydroxybenzaldehyde,
4-hydroxybenzaldehyde,
3-hydroxybenzaldehyde,
4-hydroxy-3,5-dimethoxybenzaldehyde,
4-hydroxy-2,6-dimethylbenzaldehyde,
4-hydroxy-3,5-dinitrobenzaldehyde,
2-hydroxy-3-methoxybenzaldehyde,
3-hydroxy-4-methoxybenzaldehyde,
vanillin,
3-hydroxy-2-nitrobenzaldehyde,
3-bromo-4-hydroxybenzaldehyde,
3-chloro-4-hydroxybenzaldehyde,
2-ethyl-4-hydroxybenzaldehyde,
4-hydroxy-2,6-dimethoxybenzaldehyde,
3-hydroxy-5-methoxybenzaldehyde,
3-hydroxy-4-nitrobenzaldehyde, 4-hydroxy-3-nitrobenzaldehyde,
5-hydroxy-2-nitrobenzaldehyde,
2-bromo-3-hydroxy-4-methoxybenzaldehyde,
6-bromo-3-hydroxy-4-methoxybenzaldehyde,
5-bromosalicylaldehyde,
3-chlorosalicylaldehyde,
5-chlorosalicylaldehyde,
3,5-dibromosalicylaldehyde,
3,5-dichlorosalicylaldehyde,
3,4-dimethoxysalicylaldehyde,
4,6-dimethoxysalicylaldehyde,
4,6-dimethylsalicylaldehyde,
3,5-dinitrosalicylaldehyde,
3-ethoxysalicylaldehyde,
3-fluorosalicylaldehyde,
3-methoxysalicylaldehyde,
4-methoxysalicylaldehyde,
6-methoxysalicylaldehyde,
3-nitrosalicylaldehyde,
4-nitrosalicylaldehyde,
3-propylsalicylaldehyde,
6-bromo-4-hydroxy-3-methoxybenzaldehyde,
6-chloro-4-hydroxy-3-methoxybenzaldehyde,
4-hydroxy-2-methyl-5-propylbenzaldehyde,
5-chloro-3-fluorosalicylaldehyde,
3,6-dimethylsalicylaldehyde,
p-thymolaldehyde and
salicylaldehyde.

By the expression "aniline compound" as herein employed is meant an appropriate aromatic amine of the benzene series, said amine containing no hydroxy substituent. Representative compounds include aniline, 3-bromoaniline, 2-bromoaniline, 4-bromoaniline, 2-bromo-6-ethylaniline, 2-bromo-5-nitroaniline, 3-bromo-4-nitroaniline, 4-bromo-3-nitroaniline, 5-bromo-2-nitroaniline, 2-butoxy-5-nitroaniline, 4-butoxy-3-nitroaniline, 4-secondary-butylaniline, 4-tertiary-butyl-2-nitroaniline, 3-chloroaniline, 2-chloro-3-nitroaniline, 2-chloro-4-nitroaniline, 2,4-dibromoaniline, 3,5-dibromoaniline, 3,4-dibutoxyaniline, 2,4-dichloroaniline, 3,5-dichloroaniline, 3,4-diethylaniline, 2,4-difluoroaniline, 2,5-diisopropylaniline, 2,4-diisopropylaniline, 2,3-dimethoxyaniline, 3,4-dimethoxyaniline, 2,3-dinitroaniline, 2,4-dinitroaniline, 3-ethylaniline, 2-fluoroaniline, 4-fluoroaniline, 2-fluoro-4-nitroaniline, 3-fluoro-4-nitroaniline, 4-isobutyl-3-nitroaniline, 2-isopropoxy-5-nitroaniline, 3-isopropylaniline, 4-isopropylaniline, 2-isopropyl-5-methylaniline, 5-isopropyl-2-methylaniline, 3-nitroaniline, 2-nitro-4-propoxyaniline, 4-nitro-3-propoxyaniline, 2-ethyl-3-methoxyaniline, 5-fluoro-3-methoxyaniline, 3-methoxy-4-methylaniline, 3-methoxy-5-nitroaniline, 5-bromo-2-methoxyaniline, 3-chloro-2-methoxyaniline, 3-fluoro-2-methoxyaniline, 2-bromo-4,6-diethylaniline, 2-bromo-3,4-dimethoxyaniline, 2,6-dibromo-4-fluoroaniline, 4,5-dibromo-2-nitroaniline and 2,4-diisopropyl-5-nitroaniline.

The first step of the reaction may be carried out by reacting substantially equimolar proportions of the appropriate benzaldehyde compound or hydroxybenzaldehyde compound with correspondingly the appropriate aminophenol compound or aniline compound, or the hydrohalide salt of the aminophenol or aniline compound. The reaction is usually carried out in the presence of a solvent or liquid reaction medium over a period of from about 5 minutes to 24 hours in the temperature range of from about 15° to 100° C. with the formation of the desired Schiff base phenol intermediate and water of reaction. The preferred conditions for carrying out the preparation of the Schiff base phenol intermediate depends in part on whether the aniline or aminophenol compound is employed as a free base or as its hydrohalide salt.

In one method of carrying out this step, the appropriate aldehyde compound is added to an aqueous solution of the appropriate amine hydrohalide compound. (The latter is prepared by dissolving the appropriate amine in sufficient dilute hydrohalic acid to maintain the amine in solution as its hydrohalic acid salt or by dissolving the amine hydrochloride or hydrobromide in water.) The reaction mixture is agitated to insure complete dispersion of the aldehyde and allowed to react at a temperature of from about 20° to 60° C. for a period of from about 0.25 to 2 hours. At the end of this period, sodium acetate is added to the reaction mixture whereupon a Schiff base phenol intermediate precipitates as a solid or an oil. The sodium acetate may be added as a solid or as an aqueous solution over a period of from about 5 minutes to 30 minutes. The Schiff base phenol intermediate may be recovered from the reaction mixture by conventional procedures such as filtration, decantation or extraction with an appropriate water-insoluble solvent such as ether or methylene chloride and may thereafter be purified, if desired, by washing, decolorizing a solution thereof with activated charcoal and/or by recrystallization. Suitable solvents for recrystallization include pentane, hexane, isooctane, carbon tetrachloride, methanol, ethanol, isopropyl alcohol and alcohol-water combinations.

In an alternative method for carrying out the first step and preferred for preparing a Schiff base phenol derived from a hydroxybenzaldehyde compound and an aniline compound, substantially equimolar proportions of the appropriate reactants are mixed together in an organic solvent and the resulting mixture heated at reflux temperature from about 0.25 to 1.0 hour to obtain the desired Schiff base phenol intermediate and water of reaction. Suitable solvents include ethanol, propanol, butanol and benzene. After completion of the reaction, the Schiff base phenol intermediate is recovered from the reaction mixture by conventional procedures, the most suitable method depending on the solvent employed. Thus, when benzene is the solvent, the water of reaction is co-distilled with the organic solvent, excess organic solvent distilled off and Schiff base phenol intermediate recovered as residue. When alcoholic solvent is employed, the Schiff base phenol intermediate usually precipitates in the reaction mixture and may be recovered by filtration; alternatively, the solvent and water may be vaporized off and the intermediate recovered as residue. The latter may be purified, if desired, by conventional procedures as previously set forth.

In the second step for carrying out the preparation of the compounds of the invention, a substantially equimolar proportion or an excess of methyl isocyanate is mixed together and reacted with a Schiff base phenol intermediate prepared as above described at a temperature of from 0° to 40° C. for a period of from 1 to 48 hours. The reaction is preferably carried out in the presence of a catalyst and a solvent. Suitable catalysts include triethylamine, pyridine, picoline and collidine. A suitable amount of catalyst is considered to be about 3 to 4 drops per gram of Schiff base phenol employed although frequently larger amounts are desirable. Preferred solvents are methylene chloride and dimethylformamide. For many preparations where solubility of the Schiff base phenol permits, pentane, hexane and other hydrocarbon solvents may be employed. Alternatively, the reaction may be carried out in excess triethylamine, pyridine, picoline or collidine, said bases functioning both as a catalyst and as a solvent. As a result of these operations, the desired Schiff base carbamate product is formed. The latter usually precipitates in the reaction mixture but may remain in solution. The product may be recovered by filtration if it precipitates as a solid, or as residue by evaporating or distilling off the solvent. The product may then be purified by washing or decolorizing with activated charcoal and by recrystallization from a suitable solvent such as methylene dichloride, pentane, hexane, isooctane or a mixture thereof. The products in which the methylcarbamoyloxy group is in the meta position with respect to the Schiff base linkage, —N=CH—, tend to be glassy solids or viscous liquids. The glassy solids are not readily recrystallized, and the preferred method of purification is grinding the glassy solid in an inert solvent.

In a preferred method for carrying out the preparation of the compounds of the invention derived from a benzaldehyde compound and an aminophenol compound, an appropriate benzaldehyde compound is added to an aqueous hydrochloric acid solution of the appropriate aminophenol compound. After completion of the addition, the mixture is shaken vigorously for from about 15 minutes to 1 hour and sodium acetate added thereto whereupon a reaction takes place with the formation of the desired Schiff base phenol intermediate. The latter is recovered from the reaction mixture and purified, if desired, as previously described.

The Schiff base phenol thus prepared is mixed with methyl isocyanate in methylene chloride or dimethylformamide solvent and a few drops of triethylamine catalyst added thereto. The resulting mixture is allowed to stand at 0° to 40° C. for from 1 to 48 hours whereupon a reaction takes place with the formation of the desired Schiff base carbamate product. The latter is recovered by filtration or by vaporizing off the solvent and thereafter purified, if desired, by conventional procedures.

In a preferred method for carrying out the preparation of the compounds of the invention derived from a hydroxybenzaldehyde compound and an aniline compound, the appropriate hydroxybenzaldehyde compound and the appropriate aniline compound are mixed together and heated at reflux temperature for from about 15 minutes to 1 hour to obtain the desired Schiff base phenol intermediate. The latter is recovered from the reaction mixture and purified, if desired, as previously described. The Schiff base phenol intermediate is then reacted with methyl isocyanate as above described.

The following examples illustrate the invention but are not to be construed as limiting.

EXAMPLE 1

*4-benzylideneamino-3-tertiary-butylphenyl methylcarbamate*

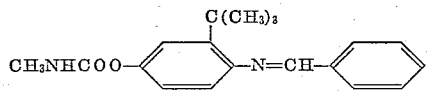

2.12 grams (0.02 mole) of benzaldehyde was added to a solution of 3.30 grams (0.02 mole) of 4-amino-3-tertiary-butylphenol in 2½ percent excess (molar basis) of 1 normal hydrochloric acid. The resulting heterogeneous mixture was shaken and then treated with a solution of 2.92 grams of sodium acetate trihydrate in 20 milliliters of water. An oily phase immediately formed which crystallized upon repeated washing (by decantation) with cold water to produce a 4-benzylideneamino-3-tertiary-butylphenol intermediate as a yellow-green solid melting at 121°–122° C.

A solution of 3.0 grams (0.012 mole) of the above 4-benzylideneamino-3-tertiary-butylphenol in 10 milliliters warm methylene chloride was diluted with 30 milliliters of warm hexane. To this nearly saturated solution was added 0.68 gram (0.012 mole) of methyl isocyanate and 3 drops of triethylamine. The mixture was allowed to stand at room temperature over the weekend whereupon the desired 4-benzylideneamino-3-tertiary-butylphenyl methylcarbamate product precipitated as rosettes of yellow-green crystals. The latter melted at 109.5–111° C. and amounted to a yield of 3.1 grams.

EXAMPLE 2

*4-benzylideneaminophenyl methylcarbamate*

20.5 milliliters (21.5 grams; 0.2 mole) of benzaldehyde was added to a solution of 21.8 grams (0.2 mole) of p-aminophenol in 200 milliliters of 1 normal-hydrochloric acid. The mixture was agitated and a solution of 29.2 grams sodium acetate trihydrate in 100 milliliters of water added thereto. A reaction took place with the precipitation of crystals of a 4-benzylideneaminophenol intermediate. The latter was recovered by filtration and recrystallized from 50 percent ethanol to obtain yellow to yellow-brown crystals having a melting point of 183.5°–184.5° C.

19.3 grams (0.1 mole) of the above 4-benzylideneaminophenol intermediate was dissolved in 450 milliliters of triethylamine and 5.7 milliliters (0.1 mole) of methyl isocyanate added thereto. The reaction mixture was allowed to stand for an hour, the solvent then partially evaporated under reduced pressure therefrom and the resulting mixture allowed to stand overnight at 0° C. to precipitate the desired 4-benzylideneaminophenyl methylcarbamate product as fine yellow crystals melting from 106° to 110° C. A sample recrystallized from a mixture of methylene chloride-hexane had a melting point of 113°–115° C.

EXAMPLE 3

*4-(2,4-dichlorobenzylideneamino)-3,5-xylyl methylcarbamate*

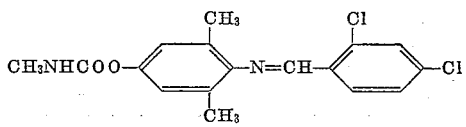

In a similar manner as previously described, 8.75 grams (0.05 mole) of 2,4-dichlorobenzaldehyde and a solution of 7.3 grams of sodium acetate trihydrate were added in successive steps to a solution of 6.85 grams (0.05 mole) of 4-amino-3,5-xylenol in 50 milliliters of 1 normal hydrochloric acid to obtain an intermediate 4-(2,4-dichlorobenzylideneamino)-3,5-xylenol as a yellow-brown solid. The latter after repeated recrystallization from pentane-methylene chloride melted at 125° C.

0.25 milliliter (0.0044 mole) of methyl isocyanate and a drop of triethylamine catalyst were added to a solution of 1.0 gram (0.0034 mole) of the above 4-(2,4-dichlorobenzylideneamino)-3,5-xylenol intermediate in 3 milliliters of dimethylformamide. The resulting reaction mixture was warmed to remove the solvent and to recover as residue a 4-(2,4-dichlorobenzylideneamino)-3,5-xylyl methylcarbamate product which on recrystallization from methylene chloride-pentane melted at 136°–138° C.

EXAMPLE 4

In a manner similar to that previously described, the following Schiff base carbamates were prepared:

4-(4-chlorobenzylideneamino) - 3 - tertiary-butylphenyl methylcarbamate as yellow crystals melting at 148°–150° C. by the reaction of 4-chlorobenzaldehyde with 4-amino-3-tertiary-butylphenol to produce an intermediate 4-(4-chlorobenzylideneamino)-3-tertiary-butylphenol followed by the reaction of the latter with methyl isocyanate.

4-(2,4-dichlorobenzylideneamino) - 3 - tertiary - butyl methylcarbamate as yellow crystals having a melting point of 124°–125° C. by the reaction of 2,4-dichlorobenzaldehyde with 4-amino-3-tertiary-butylphenol to produce an intermediate 4-(2,4-dichlorobenzylideneamino)-3-tertiary-butylphenol followed by the reaction of the latter with methyl isocyanate.

4-benzylideneamino-3,5-xylyl methylcarbamate as yellow crystals melting from 111°–113° C. by the reaction of benzaldehyde with 4-amino-3,5-xylenol to produce an intermediate 4-benzylideneamino-3,5-xylenol followed by the reaction of the latter with methyl isocyanate.

4-(4-chlorobenzylideneamino)-3,5-xylyl methylcarbamate melting from 188° to 195° C. by the reaction of 4-chlorobenzaldehyde with 4-amino-3,5-xylenol followed by the reaction of the latter with methyl isocyanate.

4-(4-dimethylaminobenzylideneamino)-3,5-xylyl methylcarbamate melting at 156° C. by the reaction of 4-dimethylaminobenzaldehyde with 4-amino-3,5-xylenol to produce an intermediate 4-(4-dimethylaminobenzylideneamino)-3,5-xylenol followed by the reaction of the latter with methyl isocyanate.

2-benzylideneaminophenyl methylcarbamate as white granular crystals melting at 126°–127° C. by the reaction of benzaldehyde with 2-aminophenol to produce an intermediate 2-benzylideneaminophenol followed by the reaction of the latter with methyl isocyanate.

2-(4-chlorobenzylideneamino)phenyl methylcarbamate melting from 149° to 156° C. by the reaction of 4-chlorobenzaldehyde with 2-aminophenol to produce an intermediate 2-(4-chlorobenzylideneamino)phenol followed by the reaction of the latter with methyl isocyanate.

2-(2,4 - dichlorobenzylideneamino)phenyl methylcarbamate melting from 121° to 126° C. by the reaction of 2,4-dichlorobenzaldehyde with 2-aminophenol to produce an intermediate 2-(2,4-dichlorobenzylideneamino)phenol followed by the reaction of the latter with methyl isocyanate.

2-(4-dimethylaminobenzylideneamino)phenyl methylcarbamate having a melting point of 157°–159° C. by the reaction of 4-dimethylaminobenzaldehyde with 2-aminophenol to produce an intermediate 2-(4-dimethylaminobenzylideneamino)phenol followed by the reaction of the latter with methyl isocyanate.

2-(4-bromobenzylideneamino)phenyl methylcarbamate having a melting point of 166°–167° C. by the reaction of 4-bromobenzaldehyde with 2-aminophenol to produce an intermediate 2-(4-bromobenzylideneamino)phenol followed by the reaction of the latter with methyl isocyanate.

2-(3-fluorobenzylideneamino)phenyl methylcarbamate having a melting point of 118.5°–120° C. by the reaction of 3-fluorobenzaldehyde and 2-aminophenol to produce an intermediate 2-(3-fluorobenzylideneamino)phenol followed by the reaction of the latter with methyl isocyanate.

2-(2-nitrobenzylideneamino)phenyl methylcarbamate having a melting point of 148°–149° C. by the reaction of 2-nitrobenzaldehyde with 2-aminophenol to produce the intermediate 2-(2-nitrobenzylideneamino)phenol followed by the reaction of the latter with methyl isocyanate.

EXAMPLE 5

*2-(4-nitrobenzylideneamino)-4-nitrophenyl methylcarbamate*

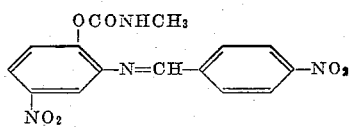

3.8 grams (0.025 mole) of 4-nitrobenzaldehyde was added to a boiling solution of 3.9 grams (0.025 mole) of 2-amino-4-nitrophenol in about 20 milliliters of ethanol. The mixture was heated at reflux temperature for a few minutes and thereafter cooled to 0° C. to obtain as a precipitate 4.0 grams of a 2-(4-nitrobenzylideneamino)-4-nitrophenol intermediate as drab-green crystals, melting at 232° C. with decomposition.

0.39 milliliter (0.0067 mole) of methyl isocyanate and four drops of triethylamine were added to a solution of 0.98 gram of the 2-(4-nitrobenzylideneamino)-4-nitrophenol above prepared in 15 milliliters of methylene chloride. A reaction took place with slight heating and the formation of a desired 2-(4-nitrobenzylideneamino)-4-nitrophenyl methylcarbamate product which precipitated in the reaction mixture as a crystalline solid. The latter was recovered by filtration and washed with pentane to obtain a purified product as a dull green solid melting at 215° C.

EXAMPLE 6

In reactions carried out in a manner similar to that described in Example 5, the following compounds are prepared:

2-benzylideneamino-4-nitrophenyl methylcarbamate as a rust orange solid melting at 233° C. with decomposition by the reaction of benzaldehyde with 2-amino-4-nitrophenol to produce the intermediate 2-benzylideneamino-4-nitrophenol followed by the reaction of the latter with methyl isocyanate.

2-(4 - chlorobenzylideneamino)-4-nitrophenyl methylcarbamate as a tan solid melting at 143°–144° C. by the reaction of 4-chlorobenzaldehyde with 2-amino-4-nitrophenol to produce the intermediate 2-(4-chlorobenzylideneamino)-4-nitrophenol followed by the reaction of the latter with methyl isocyanate.

2-(4-dimethylaminobenzylideneamino) - 4 - nitrophenyl methylcarbamate as an olive-green solid melting at 227°–227.5° C. by the reaction of 4-dimethylaminobenzaldehyde with 2-amino-4-nitrophenol to produce the intermediate 2-(4 - dimethylaminobenzylideneamino)-4-nitrophenol, followed by the reaction of the latter with methyl isocyanate.

2-(4-bromobenzylideneamino) - 4 - nitrophenyl methylcarbamate as a purplish-gray crystalline solid melting at 163°–163.5° C. by the reaction of 4-bromobenzaldehyde with 2-amino-4-nitrophenol to produce the intermediate 2-(4-bromobenzylideneamino)-4-nitrophenol followed by the reaction of the latter with methyl isocyanate.

2-(4-isopropylbenzylideneamino)phenyl methylcarbamate having a molecular weight of 296 by the reaction of 4-isopropylbenzaldehyde with 2-aminophenol to produce the intermediate 2-(4-isopropylbenzylideneamino)phenol followed by the reaction of the latter with methyl isocyanate.

2-(3-methoxybenzylideneamino)phenyl methylcarbamate having a molecular weight of 284 by the reaction of 3-methoxybenzaldehyde with 2-aminophenol to produce the intermediate 2-(3-methoxybenzylideneamino)phenol followed by the reaction of the latter with methyl isocyanate.

EXAMPLE 7

*3-(3-nitrobenzylideneamino)phenyl methylcarbamate*

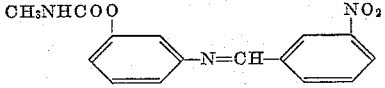

3.02 grams (0.020 mole) of 3-nitrobenzaldehyde was added to a solution of 2.18 grams of 3-aminophenol (0.020 mole) in 10 milliliters of hot butanol. The mixture was heated at the boiling point for 5 minutes after which the butanol was removed at 100° C. with an air stream to obtain a solid residue. The latter was ground under ether (with subsequent removal of the ether at 100° C.) to obtain 5.01 grams of a 3-(3-nitrobenzylideneamino)phenol intermediate as a gold-colored solid with a melting point higher than 300° C.

1.0 milliliter (0.028 mole) of methyl isocyanate and four drops of triethylamine were added with stirring to a solution of 2.5 grams (0.01 mole) of the 3-(3-nitrobenzylideneamino)phenol intermediate prepared as above described in 20 milliliters of dimethylformamide. The resulting mixture was allowed to stand overnight at room temperature and thereafter the dimethylformamide removed by vaporization under reduced pressure to obtain a desired 3-(3-nitrobenzylideneamino)phenyl methylcarbamate product as a glassy solid residue. The latter was ground in methylene chloride to obtain a purified product as a yellow powder melting at 240° C. with decomposition.

EXAMPLE 8

In reactions carried out in a similar manner, the following compounds were prepared:

3-benzylideneaminophenyl methylcarbamate as a tan solid melting at 240° C. with decomposition by the reaction of benzaldehyde with 3-aminophenol, followed by the reaction of the latter with methyl isocyanate.

3 - (2,4 - dichlorobenzylideneamino)phenyl methylcarbamate as a tan solid melting at 137° C. with decomposition by the reaction of 2,4-dichlorobenzaldehyde with 3- aminophenol, followed by the reaction of the latter with methyl isocyanate.

3 - (3,4 - diethoxybenzylideneamino)phenyl methylcarbamate as a very viscous gold-colored oil having a molecular weight of 342 by the reaction of 3,4-diethoxybenzaldehyde with 3-aminophenol, followed by the reaction of the latter with methyl isocyanate.

EXAMPLE 9

α-(4-dimethylaminophenylimino)-o-tolyl methylcarbamate

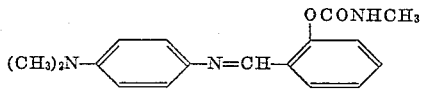

6.1 grams (0.05 mole) of salicylaldehyde and 6.8 grams (0.05 mole) of 4-dimethylaminoaniline and 100 milliliters of benzene were mixed together and the resulting mixture heated to distill off the water of reaction as a benzene-water azeotrope, the benzene being replaced as it was distilled off. The remaining benzene was then distilled off and the oily residue poured onto a glass plate wherein it set to a hard dark solid. The latter was triturated with ethanol to obtain an α-(4-dimethylaminophenylimino)-o-cresol intermediate as orange platelets melting at 135°–136.5° C.

3.0 grams (0.0125 mole) of the above α-(4-dimethylaminophenylimino)-o-cresol intermediate was dissolved in 25 milliliters of methylene chloride and 0.9 milliliter (0.016 mole) of methyl isocyanate and a drop of triethylamine added thereto. The mixture was allowed to stand for a day at room temperature and the solvent then flashed off on a steam bath to produce 2.0 grams of an α-(4 - dimethylaminophenylimino)-o-tolyl-methylcarbamate product as bright yellow crystals having a melting point of 150°–151° C.

EXAMPLE 10

α-(4-chlorophenylimino)-o-tolyl methylcarbamate

In a similar manner, an α-(4-chlorophenylimino)-o-cresol intermediate as glistening orange crystals having a melting point of 100°–102° C. was prepared from silicylaldehyde and 4-chloroaniline.

1.05 milliliters (0.0184 mole) of methyl isocyanate and a few drops of triethylamine were added to a solution of 3.60 grams (0.0155 mole) of the α-(4-chlorophenylimino)-o-cresol intermediate prepared as above described in 20 milliliters of methylene chloride and the resulting mixture allowed to stand at room temperature for two days. At the end of this period, a major portion of the solvent was removed by vaporization to obtain an α - (4 - chlorophenylimino)-o-tolyl methylcarbamate product as precipitate. The latter was recovered by filtration and was found to be a white prismatic solid. The melting point of the product was 185°–188° C.

EXAMPLE 11

In reactions carried out similar to that described in Example 9, the following methylcarbamates were prepared:

α-Phenylimino-o-tolyl methylcarbamate melting from 89°–93° C. by the reaction of salicylaldehyde and aniline to produce an intermediate α-phenylimino-o-cresol followed by the reaction of the latter with methyl isocyanate.

α-(2-chlorophenylimino)-o-tolyl methylcarbamate as a white solid having a melting point of 165°–167° C. by the reaction of salicylaldehyde with 2-chloroaniline to produce an intermediate α-(2-chlorophenylimino)-o-cresol followed by the reaction of the latter with methyl isocyanate.

α-(3-chlorophenylimino)-o-tolyl methylcarbamate as a white solid melting from 113°–116° C. by the reaction of salicylaldehyde with 3-chloroaniline to produce an intermediate α-(3-chlorophenylimino)-o-cresol followed by the reaction of the latter with methyl isocyanate.

α-(2,4 - dichlorophenylimino)-o-tolyl methylcarbamate as yellow crystals having a melting point of 125°–126° C. by the reaction of salicylaldehyde with 2,4-dichloroaniline to produce an intermediate α-(2,4-dichlorophenylimino)-o-cresol followed by the reaction of the latter with methyl isocyanate.

α-(2,5-dichlorophenylimino)-o-tolyl methylcarbamate as while prisms melting from 162°–166° C. by the reaction of salicylaldehyde with 2,5-dichloroaniline to produce an intermediate α-(2,5-dichlorophenylimino)-o-cresol followed by the reaction of the latter with methyl isocyanate.

α-(3,4-dichlorophenylimino)-o-tolyl methylcarbamate as white granular solid melting from 140°–143° C. by the reaction of salicylaldehyde with 3,4-dichloroaniline to produce an intermediate α-(3,4-dichlorophenylimino)-o-cresol followed by the reaction of the latter with methyl isocyanate.

α-(4-tolylimino)-o-tolyl methylcarbamate as a cream-colored solid melting from 130°–133° C. by the reaction of salicylaldehyde with 4-methylaniline to produce an intermediate α-(4-tolylimino)-o-cresol followed by the reaction of the latter with methyl isocyanate.

EXAMPLE 12

α-(2,5-dimethoxyphenylimino)-m-tolyl methylcarbamate

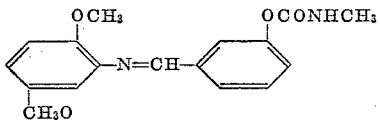

In a manner similar to that described in Example 7, an α-(2,5-dimethoxyphenylimino)-m-cresol intermediate having a melting point of 97°–98° C. was prepared by the reaction of 3-hydroxybenzaldehyde and 2,5-dimethoxyaniline.

0.75 milliliter (0.013 mole) of methyl isocyanate and four drops of triethylamine were added with agitation to a solution of 2.5 grams (0.0097 mole) of the α-(2,5-dimethoxyphenylimino)-m-cresol intermediate above prepared in 15 milliliters of methylene chloride. The resulting mixture was allowed to stand at room temperature for 24 hours and the solvent thereafter removed by vaporization to obtain an α-(2,5-dimethoxyphenylimino)-m-tolyl methylcarbamate product as a glassy solid. The latter was ground in pentane and recovered by filtration. The product was a greenish-yellow solid melting from 100° C. to 120° C.

EXAMPLE 13

α-Phenylimino-m-tolyl methylcarbamate

In a manner similar to that described in Example 7, α-phenylimino-m-cresol intermediate (M.P. 83°–85°C.) was prepared from aniline and m-hydroxybenzaldehyde.

A solution in methylene chloride of 1.7 grams of the α-phenylimino-m-cresol intermediate thus prepared was reacted with 1.48 milliliters of methyl isocyanate in the presence of 4 drops of triethylamine catalyst to obtain a desired α-phenylimino-m-tolyl methylcarbamate product as a tan solid melting at 65°–66° C.

EXAMPLE 14

α-(3-chlorophenylimino)-p-tolyl methylcarbamate

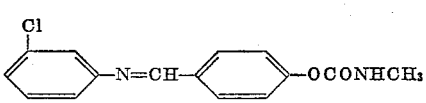

In a method similar to that described in Example 5, 24.4 grams (0.20 mole) of 4-hydroxybenzaldehyde and 25.5 grams (0.20 mole) of 3-chloroaniline were reacted in 125 milliliters of boiling ethanol to obtain 32.8 grams of an α-(3-chlorophenylimino)-p-cresol intermediate as a pale yellow solid.

2.45 milliliters (0.043 mole) of methyl isocyanate and four drops of triethylamine were added with agitation to a solution of 5.0 grams (0.022 mole) of the α-(3-chlorophenylimino)-p-cresol intermediate prepared as above described in 20 milliliters of methylene chloride to obtain an α-(3-chlorophenylimino)-p-tolyl methylcarbamate product which precipitated in the reaction mixture as a crystalline solid. The reaction mixture was allowed to stand overnight and the product recovered by filtration and washed with pentane. The latter was a fluffy crystalline solid melting at 134°–135° C.

EXAMPLE 15

In similar preparations, the following compounds were prepared:

α-Phenylimino-p-tolyl methylcarbamate as a tan, crystalline solid melting at 103°–104° C. by the reaction of 4-hydroxybenzaldehyde and aniline to produce an α-phenylimino-p-cresol intermediate, followed by the reaction of the latter with methyl isocyanate.

α-(4-chlorophenylimino)-p-tolyl methylcarbamate as a white crystalline solid melting at 169°–170° C. by the reaction of 4-hydroxybenzaldehyde and 4-chloroaniline to produce an intermediate α-(4-chlorophenylimino)-p-cresol, followed by the reaction of the latter with methyl isocyanate.

α-(4-bromophenylimino)-p-tolyl methylcarbamate as a white crystalline solid melting at 160°–170° C. by the reaction of 4-hydroxybenzaldehyde and 4-bromoaniline to produce an intermediate α-(4-bromophenylimino)-p-cresol, followed by the reaction of the latter with methyl isocyanate.

EXAMPLE 16

*3-(4,5-dimethoxy-2-nitrobenzylideneamino)phenylmethylcarbamate*

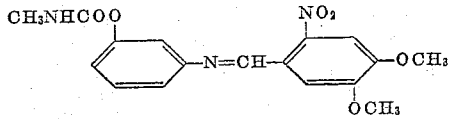

In a manner similar to that described in Example 1, 4.2 grams (0.02 mole) of 2-nitro-4,5-dimethoxybenzaldehyde and 2.18 grams (0.02 mole) of 3-aminophenol were mixed together in 20 milliliters of 1 normal hydrochloric acid solution with the addition of sufficient ethanol to completely dissolve the reactant aldehyde. Thereafter, the resulting mixture was treated with sodium acetate to obtain a 3-(4,5-dimethoxy-2-nitrobenzylideneamino)phenol intermediate having a melting point of 155°–157° C.

0.6 milliliter (0.011 mole) of methyl isocyanate and 0.5 milliliter of triethylamine were added to a cloudy solution of 1.5 grams (0.005 mole) of the 3-(4,5-dimethoxy-2-nitrobenzylideneamino)phenol intermediate and about 25 milliliters of methylene chloride. About 5 minutes after completion of the addition a reaction took place with the mixture becoming clear. The reaction mixture was allowed to stand overnight and the solvent removed by vaporization to recover as residue a 3-(4,5-dimethoxy-2-nitrobenzylideneamino)phenyl methylcarbamate product as a heavy oil having a molecular weight of 359.

EXAMPLE 17

In similar preparations, the following compounds are prepared:

4-(3-dipropylaminobenzylideneamino)phenyl methylcarbamate by the reaction of 3-dipropylaminobenzaldehyde with 4-aminophenol to produce the intermediate 4-(3-dipropylaminobenzylideneamino)phenol, followed by the reaction of the latter with methyl isocyanate.

4-(4-butoxy-3-ethoxybenzylideneamino)-3,5-dichlorophenyl methylcarbamate by the reaction of 4-butoxy-3-ethoxybenzaldehyde with 4-amino-3,5-dichlorophenol to produce the intermediate 4-(4-butoxy-3-ethoxybenzylidene-amino)-3,5-dichlorophenol, followed by the reaction of the latter with methyl isocyanate.

4-(4,5-dimethoxy-2-nitrobenzylideneamino)-3,5-xylyl methylcarbamate by the reaction of 4,5-dimethoxy-2-nitrobenzaldehyde and 4-amino-3,5-xylenol to produce the intermediate 4-(4,5-dimethoxy-2-nitrobenzylideneamino)-3,5-xylenol followed by the reaction of the latter with methyl isocyanate.

4-(2,4,6-triisopropylbenzylideneamino)-3,5-xylyl methylcarbamate by the reaction of 2,4,6-triisopropylbenzaldehyde and 4-amino-3,5-xylenol to produce the intermediate 4-(2,4,6-triisopropylbenzylideneamino)-3,5-xylenol followed by the reaction of the latter with methyl isocyanate.

The compounds of the present invention are useful as parasiticides. As agricultural pesticides, they give, for example, good control of aphids and mites when infested plants are sprayed with dispersions containing the compounds as toxic ingredients. They are further useful for the control of plant fungi, soil nematodes, and as inhibitors in nitrification of reduced nitrogen in soil. Many of these compounds are useful as herbicides, both terrestrial and aquatic.

The compounds of the present invention have also been found to be effective for the control of helminths attacking warm-blooded animals such as Bunostomum sp., Haemonchus sp., Oesophagostum sp., Ostertagi sp., Trichostrongulus sp. and Cooperia sp. In representative operations as anthelmintics, complete controls of the above helminths were obtained when, in separate operations, compositions containing 4-benzylideneamino-3,5-xylyl methylcarbamate, 3-tertiary-butyl-4-(4-chlorobenzylideseamino)phenyl methylcarbamate, 4-(2,5-dichlorobenzylideneamino)-3,5-xylyl methylcarbamate, α-(2-chlorophenylimino)-o-tolyl methylcarbamate, and 4-(4-dimethylaminobenzylideneamino)-3,5-xylyl methylcarbamate were applied at a rate of 300 parts by weight per million parts of composition.

The compounds of the present invention are also useful for the control of various water pests such as trash fish, snails and entomostracans. They are further useful for the control of household pests such as flies and cockroaches as well as for the control of bacteria and fungi.

The compounds having the structure

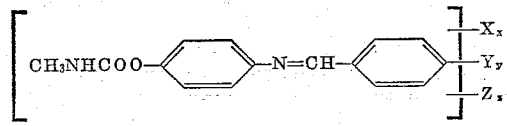

have outstanding activity against chewing-type insects as represented by Mexican bean beetle (*Epilachna varivestis*) and Southern army worm (*Prodenia eridania*). In representative operations for the control of chewing insects, 4-benzylideneamino-3-tertiary-butylphenyl methylcarbamate, 4-benzylideneamino-3,5-xylyl methylcarbamate, 3-tertiary-butyl-4-(4-chlorobenzylideneamino)-phenyl methylcarbamate, 4-(2,4-dichlorobenzylideneamino)-3,5-xylyl methylcarbamate, 4-(4-chlorobenzylideneamino)-3,5-xylyl methylcarbamate and 4-(4-dimethylaminobenzylideneamino)-3,5-xylyl methylcarbamate were separately dispersed in water to prepare aqueous spray compositions containing 25 parts per million by weight of one of the methylcarbamates per million parts by weight of ultimate spray mixture. These compositions were separately applied to a series of cranberry bean plants in amounts sufficient to wet the foliage. The leaf surfaces were then allowed to dry and the plants infested with a known number of Mexican bean beetles. Three days after infestation, the plants were examined to ascertain the control of Mexican bean beetle attributable to the test compounds. It was found that in all cases, complete kills of Mexican bean beetle were observed.

I claim:

1. A Schiff base carbamate ester having the formula

Ar—N=CH—Ar' wherein Ar and Ar' represent substituted phenyl radicals and wherein one of Ar and Ar' is substituted with a methylcarbamoyloxy radical, —OCONHCH₃, and each of Ar and Ar' may be substituted with a radical selected from the group consisting of chloro, fluoro, bromo, nitro, lower alkyl, lower alkoxy and di(lower-alkyl)amino.

2. A compound having the formula

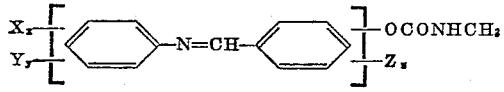

wherein X represents a radical on the phenyl ring holding the methylcarbamoyloxy radical, —OCONHCH₃, Y and Z represent radicals on the other phenyl ring; each X and each Y are selected from the group consisting of lower alkyl, lower alkoxy, bromo, chloro, fluoro and nitro, Z is a di(lower-alkyl)amino radical; $x$ and $y$ are from 0 to 3, inclusive, $z$ is from 0 to 1 and wherein each ring contains no more than three substituents selected from —OCONHCH₃, X, Y and Z.

3. 4-benzylideneamino-3-tertiary-butylphenyl - methylcarbamate.

4. 4-benzylideneaminophenyl methylcarbamate.

5. 4-(2,4-dichlorobenzylideneamino)-3,5-xylyl methylcarbamate.

6. α-(4-dimethylaminophenylimino)-o-tolyl methylcarbamate.

7. 4-benzylideneamino-3,5-xylyl methylcarbamate.

No references cited.

UNITED STATES PATENT OFFICE
CERTIFICATE OF CORRECTION

Patent No. 3,012,068            December 5, 1961

Alexander T. Shulgin

It is hereby certified that error appears in the above numbered patent requiring correction and that the said Letters Patent should read as corrected below.

Column 1, line 10, for "ester" read -- esters --; line 43, for "methylcarbaxoyloxy" read -- methylcarbamoyloxy --; column 11, line 19, for "169° -170° C." read -- 166°-168° C. --; line 25, for "160°-170° C." read -- 169°-170° C. --; column 12, lines 30 and 31, for "(4-chlorobenzylideseamino)phenyl" read -- (4-chlorobenzylid neamino)phenyl --.

Signed and sealed this 26th day of June 1962.

(SEAL)
Attest:

ERNEST W. SWIDER
Attesting Officer

DAVID L. LADD
Commissioner of Patents